United States Patent [19]

Huhta-Koivisto

[11] 4,421,605
[45] Dec. 20, 1983

[54] DISTILLATION APPARATUS UTILIZING THERMOCOMPRESSOR PRINCIPLES

[75] Inventor: Esko Huhta-Koivisto, Espoo, Finland

[73] Assignee: Oy Finn-Aqua Ltd., Finland

[21] Appl. No.: 359,924

[22] Filed: Mar. 19, 1982

[30] Foreign Application Priority Data

Mar. 27, 1981 [FI] Finland .................. 810965

[51] Int. Cl.³ .............. B01D 1/06; B01D 1/28; B01D 3/04; B01D 3/42
[52] U.S. Cl. ................. 202/181; 159/27 R; 159/46; 202/187; 202/197; 202/237; 203/26
[58] Field of Search ............... 202/179–181, 202/187, 189, 197, 235, 237; 159/27 R, 46; 203/25, 26, DIG. 4, DIG. 8

[56] References Cited

U.S. PATENT DOCUMENTS

| | | | |
|---|---|---|---|
| 2,760,919 | 8/1956 | Latham | 203/26 |
| 3,190,817 | 6/1965 | Neugebauer et al. | 203/26 |
| 3,236,748 | 2/1966 | Pottharst | 159/27 R |
| 3,486,984 | 12/1969 | Sperry | 202/187 |
| 3,489,651 | 1/1970 | De Pas | 203/26 |
| 4,304,637 | 12/1981 | Robbins | 202/235 |
| 4,342,624 | 8/1982 | Chute et al. | 202/237 |

*Primary Examiner*—Bradley Garris
*Attorney, Agent, or Firm*—Steinberg & Raskin

[57] ABSTRACT

Distillation apparatus is disclosed which operates according to the so-called thermocompressor principle and comprises a housing in which a boiling chamber is situated to accommodate the liquid to be distilled, a heating device for heating the liquid to be distilled in the boiling chamber, a feed line for conducting the liquid to be distilled into the boiling chamber, an output line for removing the distillate from the distillation apparatus, and apparatus for imparting additional energy to the vapor that is produced from the liquid to be distilled in the boiling chamber such that the temperature of the vapor on the output side of the energy imparting apparatus is increased. According to the invention, at least one heat exchange tube is provided within the distillation apparatus through which a mixture composed of the liquid to be distilled and of the vapor produced therefrom is adapted to flow. A droplet separator is provided which defines a gush or overflow gap between it and the boiling chamber and through which the liquid-vapor mixture discharging from the heat exchange tube flows whereupon the vapor flows through the droplet separator to the apparatus for imparting additional energy thereto and which is constituted by a blower disposed within the distillation apparatus. Preferably, the heat exchange tubes are disposed around the boiling chamber and extend through a vapor condensation chamber.

11 Claims, 1 Drawing Figure

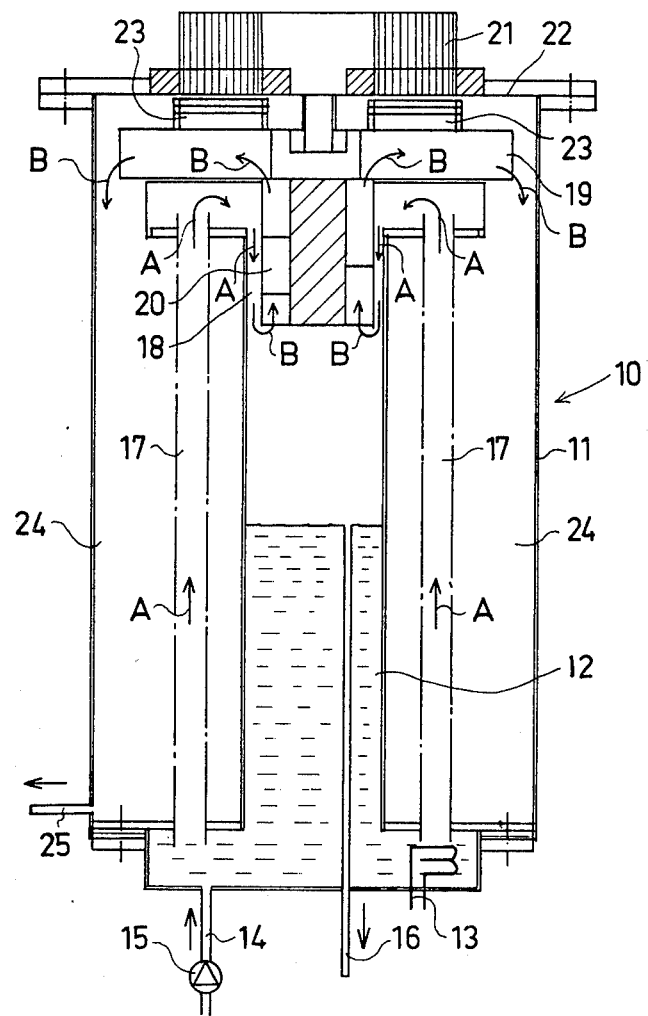

DISTILLATION APPARATUS UTILIZING THERMOCOMPRESSOR PRINCIPLES

BACKGROUND OF THE INVENTION

The present invention relates generally to distillation apparatus and, more particularly, to distillation apparatus which utilizes or operates according to the so-called thermocompressor principle.

Distillation apparatus which operate according to the so-called thermocompressor principle are known and generally comprise a housing in which a boiling chamber for accommodating the liquid to be distilled is situated, heating means for heating the liquid in the boiling chamber, feed line means for conducting liquid to be distilled into the boiling chamber, output line means for removing distillate from the distillation apparatus, and means for imparting additional energy to the vapor produced from the liquid in the boiling chamber such that the temperature of the vapor at the output side of the apparatus is increased.

Conventional distillation apparatus utilizing the so-called thermocompressor principle generally operate as follows. The liquid to be distilled is heated in the boiling chamber whereupon it evaporates with the vapor moving into the upper portion of the boiling chamber and having a temperature of about 96° C. The vapor so produced is drawn from the upper portion of the boiling chamber into a compressor which imparts additional energy thereto whereupon the temperature of the vapor increases at the output or delivery side of the compressor to about 105° C. The steam at the increased temperature is then conducted in a helical tube through the boiling chamber wherein the vapor condenses into distillate whereupon the distillate is removed from the distillation apparatus. The condensing vapor of course releases at least a part of its heat energy to the liquid to be distilled accommodated within the boiling chamber.

Although such conventional distillation apparatus which operate according to the thermocompressor principle described above have the advantage of relatively low energy consumption, e.g., about 4 kw per 100 liters/hour of liquid to be distilled, certain disadvantages are also inherent in such operation. The greatest drawback of such conventional apparatus is the admittance of impurities into the evaporated distillate flowing through the compressor which of course prevents an absolutely pure distillate from being obtained. Moreover, such distillation apparatus of the prior art are exceedingly massive and bulky and create objectionable high noise levels during operation.

Improvements have been made in the conventional distillation apparatus which operate according to the thermocompressor principle as described above in that the temperature of the vapor produced in the upper regions of the boiling chamber is higher than 100° C., usually about 105° C., whereby the pressure in the boiling chamber will exceed atmospheric pressure. As a result thereof, the temperature of the vapor will increase to about 120° C. at the output side of the compressor. However, in other respects, the various advantages and disadvantages of the improved distillation apparatus are the same as those discussed above in connection with the conventional distillation apparatus.

Also known in the art is distillation apparatus which operates in accordance with the thermocompressor principle and wherein the temperature of the vapor produced from the liquid to be distilled is increased utilizing a heat pump. In this arrangement two separate heat exchangers are utilized, one heat exchanger being situated in the upper region of the boiling chamber while the other heat exchanger is situated in the lower region of the boiling chamber. However, this arrangement is expensive in manufacture and requires a complex control mechanism for its operation.

SUMMARY OF THE INVENTION

Accordingly, it is an object of the present invention to provide new and improved distillation apparatus which operate according to the thermocompressor principle and which eliminates the drawbacks of conventional distillation apparatus of this type discussed above.

Briefly, in accordance with the present invention, this object as well as others are attained by providing distillation apparatus which operates according to the thermocompressor principle and which incorporates at least one heat exchange tube through which a mixture composed of liquid to be distilled and of a vapor thereof is adapted to flow. A droplet separator, preferably of the dynamic centrifugal separation type, is situated within the distillation apparatus in a manner so as to define a gush or overflow gap between it and a wall of the boiling chamber through which the mixture of the liquid to be distilled and of the vapor is adapted to flow after the mixture has discharged from the heat exchange tube.

After the mixture of the liquid to be distilled and the vapor is discharged from the heat exchange tube and has flowed through the gush or overflow gap with the vapor then having flowed through the droplet separator, the vapor is then directed into the means for imparting additional energy to the vapor. According to a feature of the present invention, the additional energy imparting means is constituted by blower means situated within the distillation apparatus.

According to features of the illustrated preferred embodiment, the droplet separator is provided with helical vanes and is connected to a lower face of the blower means. Waste pipe means are provided through which a part of the liquid to be distilled is discharged from the boiling chamber in a continuous manner so as to stabilize the level of the liquid within the boiling chamber. The heat exchange tube preferably extends through a vapor condensation chamber and is situated around the boling chamber. Further, it has been found expedient to situate the heating means by which the liquid to be distilled is heated within the boiling chamber below the heat exchange tube. Moreover, the blower means is preferably driven by a squirrel cage motor which provides power to the blower means through the end face of the distillation apparatus.

Distillation apparatus constructed in accordance with the present invention provides numerous significant advantages. For example, the distillation apparatus of the present invention requires an exceedingly small volume of water and the initial rate at which the liquid to be distilled is heated is quite rapid. The heat lost during operation of the apparatus is essentially returned to and utilized in the apparatus. An efficient droplet separation is obtained by the dynamic centrifugal droplet separator in accordance with the invention and the apparatus as a whole is quite compact in size and simple in construction as well as in control techniques. Furthermore, the nose levels generated by the operation of the apparatus are quite low. Importantly, when desired, there is no requirement for shaft fittings to be present in the apparatus of the invention which therefor allows a high purity distillate to be obtained. All of these advantages are obtained with only low energy comsumption requirements.

DESCRIPTION OF THE DRAWINGS

A more complete appreciation of the present invention and many of the attendant advantages thereof will be readily understood by reference to the following detailed description when considered in connection with the accompanying drawing in which:

The FIGURE is a schematic side elevation view in partial section of a preferred embodiment of the distillation apparatus of the present invention.

DESCRIPTION OF THE PREFERRED EMBODIMENT

Referring now to the drawing, the distillation apparatus of the present invention, generally designated 10, comprises a housing 11 in which a boiling chamber 12 defined by an inner wall is situated. The boiling chamber 12, accommodates the liquid to be distilled which is supplied thereto by means of a feed line 14 and pump 15. Heating means, such for example as an electric heating coil 13, are provided to heat the liquid to be distilled in the boiling chamber 12. Moreover, a waste pipe 16 extends within the boiling chamber 12 and commmunicates with the external environment. The upper end of the waste pipe 16 is situated at a selected level so that a part of the liquid to be distilled will escape therethrough in a continuous flow as additional liquid is supplied through the feed line means 14 so that in this manner the waste pipe 16 functions as an efficient and simple stabilizer for the level of the liquid to be distilled within the boiling chamber 12.

According to the present invention, heat exchange tubes 17 are provided as part of the distillation apparatus 10. The heat exchange tubes 17 are arranged such that a mixture of the liquid to be distilled and of the vapor produced therefrom will flow upwardly therethrough. A droplet separator 20, preferably of the dynamic centrifugal separation type and provided with helical vanes, is fixed as described below in an upper region of the boiling chamber 12 and defines an overflow or gush gap 18 between it and the wall of the boiling chamber. The droplet separator 20 is fixed to and extends downwardly from blower means 19 provided in the upper region of the distillation apparatus. The blower means 19 is preferably driven by drive means 21, described below.

The distillation apparatus is arranged such that after discharging from the upper ends of the heat exchange tubes 17, the liquid-vapor mixture passes through the overflow or gush gap 18 whereupon the vapor component flows into the droplet separator 20 as described below.

It has been found advantageous to utilize a short-circuited rotor or squirrel cage motor as the drive means 21 for the blower means 19. Thus, a squirrel cage motor can be situated on the upper end wall 22 of the distillation apparatus 10 so that an air gap exists between it and the blower means 19. Accordingly, the several short-circuited stacks 23 are carried on the top of blower means 19 so that the squirrel cage motor 21 will act as a so-called magnetic power input to drive the blower means 19.

The space provided between the wall defining the boiling chamber 12 and the outer wall defining the housing 11 will constitute a vapor condensation chamber 24 and a tubular connector 25 communicates with the vapor condensation chamber 24 through which distillate can be removed from the apparatus 10. It is also noted that the heat exchange tubes 17 extend through the vapor condensation chamber 24 and are situated around the boiling chamber 12.

Thus, according to another feature of the present invention, the heat exchange tubes 17 are preferably grouped around the boiling chamber 12. Moreover, the heating means 13 are preferably disposed immediately below the heat exchange tubes 17.

The distillation apparatus of the present invention in the illustrated embodiments thus comprises a housing 11 formed by an outer wall and a boiling chamber 12 situated within the housing and adapted to contain the liquid to be distilled. A vapor condensation chamber 24 is defined between the walls defining the housing 11 and boiling chamber 12. Moreover, the cylindrical wall defining the boiling chamber 12 opens at its lower end to an enlarged volume the outer regions of which extend below the vapor condensation chamber 24. A droplet separator 20 having an inlet and an outlet is disposed in an upper region of the boiling chamber 12 and defines a gush or overflow gap 18 with the cylindrical boiling chamber wall so that the inlet of the droplet separator communicates with the lower end of the gap 18. Blower means 19 are situated in fluid communication with the outlet of the droplet separator 20. At least one heat exchange tube 17 has an inlet communicating with the enlarged volume portion of the boiling chamber 12 and an outlet which communicates with the overflow or gush gap 18.

In operation, the heating means 13 which are disposed below the inlet ends of the heat exchange tubes 17 heat the liquid to be distilled so that a mixture of heated liquid and of vapor formed therefrom rises upwardly in the heat exchange tubes 17 as indicated by arrows A. In this connection, it is understood that the liquid to be distilled in the heat exchange tubes 17 will be at substantially the same level as the liquid in the boiling chamber and that the level of the surface of the liquid in the heat exchange tubes will tend to vary due to the evaporation of the liquid contained therein. The liquid-vapor mixture is discharged from the upper ends of the heat exchange tube 17 (arrows A) and move downwardly through the gush gap 18, also as indicated by arrows A. At this time, the vapor will flow into and through the droplet separator 20 as indicated by arrows B and to the blower means 19. The temperature and pressure of the vapor acted upon by the blower means 19 will increase. For example, the temperature of the vapor will increase from about 95° C. to about 105° C. The vapor at increased temperature then flows downwardly in the vapor condensation chamber 24 wherein it condenses into distillate in contact with the heat exchange tube 17, the vapor releasing its heat energy to the liquid to be distilled. The distillate is withdrawn from the vapor condenstion chamber 24 through the tubular connector 25.

It will be understood that the liquid to be distilled may of course be heated to a higher temperature in the boiling chamber 12, such as to about 110° C. In this case, the temperature of the vapor discharging from the blower means 19 will be correspondingly increased, such as to about 120° C. It is particularly noted that the mixture composed of the liquid to be distilled and of the vapor which flows in the heat exchange tubes 17 will have a very high flow velocity, such as on the order of about 20 meters per second. Thus, the flow velocity of the vapor passing through the helical vane droplet separator will have a corresponding velocity of about 30 meters per second.

As noted above, where it is advantageous to obtain an absolutely pure distillate, such as in hospital related applications and the like, magnetically coupled drive means, such as the squirrel cage motor 21 and short-circuited stack 23, may be utilized. Of course, it is understood that the distillation apparatus of the present invention may incorporate a conventional shaft inlet to the blower means 19 from a conventional motor where there is no requirement for absolute purity on the liquid to be distilled.

Obviously, numerous modification and variations of the present invention are possible in the light of the above teachings. It is therefore to be understood that within the scope of the claims appended hereto, the invention may be practiced otherwise than as specifically disclosed herein.

What is claimed is:

1. In distilling apparatus for operation according to the thermocompressor principle including a housing, a boiling chamber at least partially defined by a wall situated within the housing and adapted to contain the liquid to be distilled, means for heating the liquid to be distilled contained in the boiling chamber to produce a vapor, feed line means for conducting liquid to be distilled into the boiling chamber, means for imparting additional energy to the vapor produced in the boiling chamber having an inlet side to which the vapor formed in the boiling chamber is directed and an outlet side from which the vapor is discharged at an increased temperature, and distillate removal line means for withdrawing distillate from the distilling apparatus, the improvement comprising:

at least one heat exchange tube provided within the housing of the distilling apparatus and arranged such that a mixture composed of liquid to be distilled and a vapor flows therethrough;

droplet separation means provided within said housing, said droplet separation means being situated so as to define a gap between it and a wall defining the boiling chamber, and through which gap the mixture of liquid to be distilled and vapor discharging from said at least one heat exchange tube is adapted to flow;

said droplet separation means being arranged such that after the mixture of liquid to be distilled and vapor flows through said gap, the vapor flows through said droplet separator into said means for imparting additional energy to the vapor; and wherein said means for imparting additional energy to the vapor is constituted by blower means situated within said distillation apparatus.

2. The combination of claim 1 wherein said droplet separation means is of the dynamic centrifugal type.

3. The combination of claim 2 wherein said droplet separation means is constituted by a droplet separator having helical vanes.

4. The combination of claim 1 wherein said blower means is situated over said droplet separator means and has a lower face to which said droplet separator means is connected.

5. The combination of claim 1 further including waste pipe means disposed within said boiling chamber and through which a part of the liquid to be distilled is continuously discharged from the boiling chamber, said waste pipe means thereby operating to stabilize the level of the liquid to be distilled in the boiling chamber.

6. The combination of claim 1 wherein said at least one heat exchange tube is disposed externally of and around said boiling chamber.

7. The combination of claim 1 wherein said heating means is disposed below said at least one heat exchange tube.

8. The combination of claim 1 wherein said housing includes an upper end face and further including means for driving said blower means, said drive means comprising a squirrel-cage motor adapted to supply power to said blower means through said upper end face to drive the same.

9. The combination of claim 1 further including a vapor condensation chamber disposed so as to surround said at least one heat exchange tube.

10. Distillation apparatus for operation according to the thermocompressor principle comprising:

a housing;

a boiling chamber situated within said housing adapted to contain the liquid to be distilled;

a droplet separator having an inlet and an outlet, said separator being disposed in an upper region of said chamber and defining a gap with a wall of said chamber, the inlet of said droplet separator being in communication with said gap;

blower means situated in fluid communication with the outlet of said droplet separator;

at least one heat exchange tube having an inlet communicating with said chamber and an outlet in communication with said gap defined by said droplet separator and said chamber wall;

whereby a mixture composed of liquid to be distilled and vapor flows through said at least one heat exchange tube and passes through said gap whereupon the vapor flows through said droplet separator into said blower means wherein the temperature of the vapor is increased.

11. The combination of claim 10 wherein a vapor condensation chamber is defined between a wall of said housing and said boiling chamber and wherein said at least one heat exchange tube is situated in said vapor condensation chamber proximate to said boiling chamber.

* * * * *